United States Patent
Yaita

(10) Patent No.: US 11,768,214 B2
(45) Date of Patent: Sep. 26, 2023

(54) AUTOMATIC ANALYZER AND AUTOMATIC ANALYSIS METHOD

(71) Applicant: JEOL Ltd., Tokyo (JP)

(72) Inventor: Tsuyoshi Yaita, Tokyo (JP)

(73) Assignee: JEOL Ltd., Tokyo (JP)

( * ) Notice: Subject to any disclaimer, the term of this patent is extended or adjusted under 35 U.S.C. 154(b) by 394 days.

(21) Appl. No.: 17/023,561

(22) Filed: Sep. 17, 2020

(65) Prior Publication Data

US 2021/0088544 A1      Mar. 25, 2021

(30) Foreign Application Priority Data

Sep. 20, 2019   (JP) ................................ 2019-171961

(51) Int. Cl.
*G01N 35/10*   (2006.01)

(52) U.S. Cl.
CPC ..... *G01N 35/1016* (2013.01); *G01N 35/1002* (2013.01); *G01N 35/1004* (2013.01)

(58) Field of Classification Search
CPC ........... G01N 35/1016; G01N 35/1002; G01N 35/1004; G01N 2035/1032
See application file for complete search history.

(56) References Cited

U.S. PATENT DOCUMENTS

| | | | |
|---|---|---|---|
| 5,876,668 A | | 3/1999 | Kawashima et al. |
| 6,500,388 B1 | * | 12/2002 | Nagaoka ................ G01N 35/02 422/537 |
| 2012/0318302 A1 | * | 12/2012 | Nakayama ......... G01N 35/1004 134/26 |

FOREIGN PATENT DOCUMENTS

| | | | |
|---|---|---|---|
| JP | H08194004 A | 7/1996 | |
| JP | 5028350 B2 * | 9/2012 | ............. G01N 35/00 |
| JP | 5028350 B2 | 9/2012 | |
| JP | 2013148516 A * | 8/2013 | |

OTHER PUBLICATIONS

Extended European Search Report issued in EP20196606.6 dated Feb. 11, 2021.

* cited by examiner

*Primary Examiner* — P. Kathryn Wright
*Assistant Examiner* — Curtis A Thompson
(74) *Attorney, Agent, or Firm* — THE WEBB LAW FIRM

(57) ABSTRACT

An automatic analyzer includes: a specimen holding unit configured to hold a specimen container in which a specimen is stored; a dispensed container holding unit configured to hold a plurality of dispensed containers; a dispensing probe configured to separate a predetermined amount of the specimen from the specimen container, and configured to dispense the specimen into the dispensed container; a probe washing device configured to wash a leading end of the dispensing probe in a washing liquid; and a controller configured to control driving of the dispensing probe. The controller includes an arithmetic processing unit configured to calculate a concentration of the specimen in the specimen container. The specimen is subject to dilution with the washing liquid adhered to the leading end of the dispensing probe in the probe washing device. The arithmetic processing unit sets a maximum number of times for dispensing the specimen, based on the concentration.

6 Claims, 4 Drawing Sheets

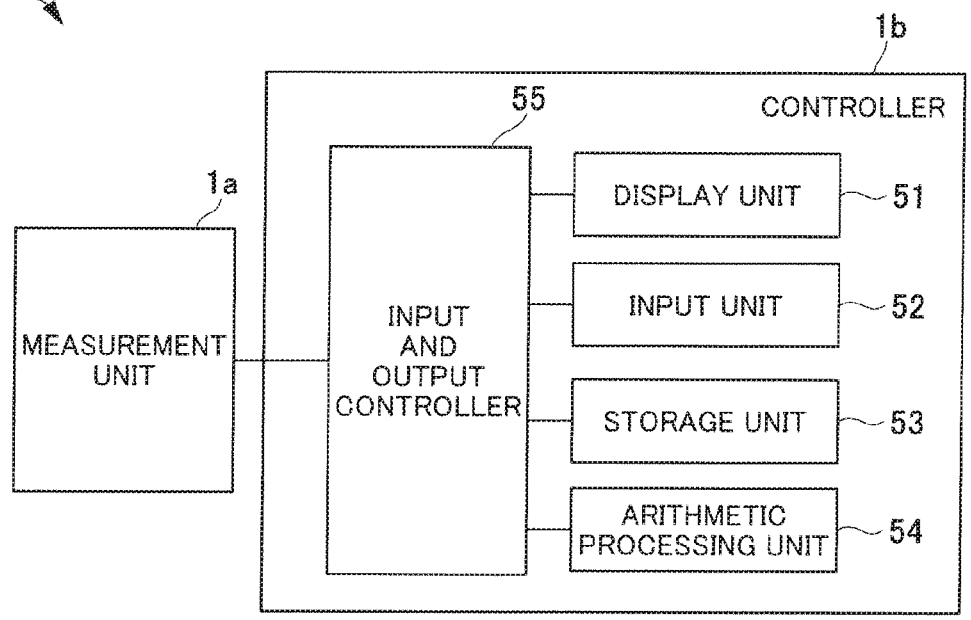
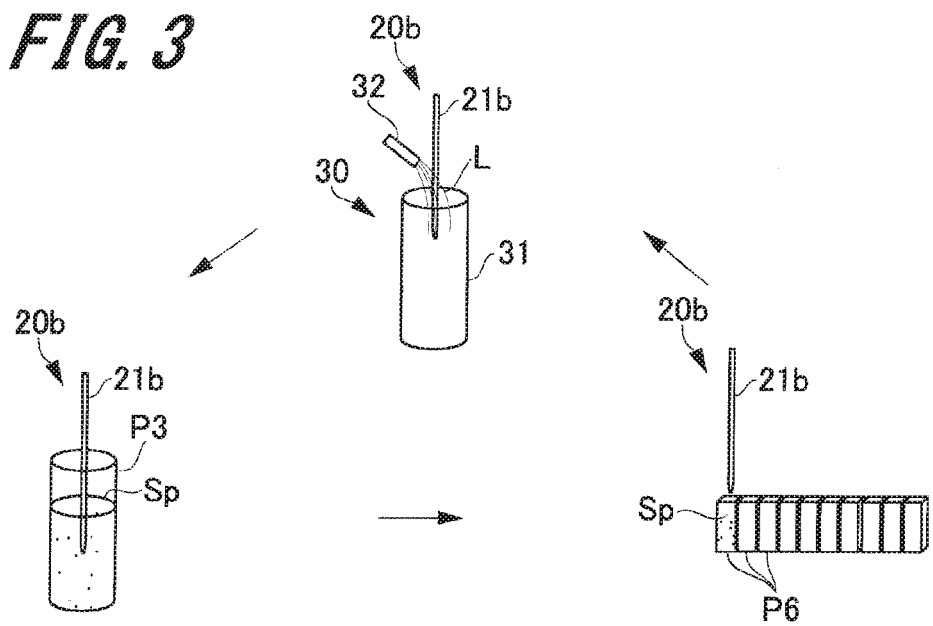

FIG. 5

[jmax]

| Initial amount [V₀] (μl) | Average value of diluted specimen usage amounts [S_m] (μl) including dispensing loss amount [b]=3.0 (μl) | | | | | | | | | | | | | | | | | | | | | | | | |
|---|---|---|---|---|---|---|---|---|---|---|---|---|---|---|---|---|---|---|---|---|---|---|---|---|---|
| | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| 50 | | | | | | 5 | 5 | 5 | 5 | 4 | 4 | 4 | 4 | 4 | 4 | 4 | 4 | 3 | 3 | 3 | 3 | 3 | 3 | 3 |
| 100 | 7 | 6 | 6 | 6 | 5 | 5 | 5 | 5 | 5 | 5 | 7 | 7 | 7 | 6 | 6 | 6 | 6 | 6 | 6 | 5 | 5 | 5 | 5 | 5 |
| 150 | 12 | 12 | 11 | 10 | 10 | 9 | 9 | 8 | 9 | 8 | 7 | 7 | 8 | 9 | 9 | 8 | 8 | 8 | 8 | 7 | 7 | 7 | 7 | 7 |
| 200 | 18 | 17 | 16 | 15 | 14 | 13 | 13 | 12 | 11 | 11 | 10 | 10 | 9 | 9 | 10 | 12 | 11 | 11 | 11 | 10 | 10 | 10 | 9 | 8 |
| 250 | 24 | 22 | 21 | 20 | 19 | 16 | 17 | 16 | 16 | 15 | 14 | 14 | 13 | 13 | 15 | 13 | 13 | 12 | 12 | 12 | 11 | 11 | 11 | 10 |
| 300 | 29 | 27 | 25 | 24 | 23 | 21 | 20 | 19 | 19 | 17 | 17 | 16 | 15 | 15 | 16 | 16 | 15 | 15 | 14 | 14 | 13 | 13 | 12 | 12 |

Washing liquid introduced amount [a]=0.1 μl
Dispensing loss amount [b]=3.0 μl

AUTOMATIC ANALYZER AND AUTOMATIC ANALYSIS METHOD

CROSS-REFERENCE TO RELATED APPLICATION

This application claims priority to Japanese Patent Application No. 2019-171961 filed Sep. 20, 2019, the disclosure of which is hereby incorporated by reference in its entirety.

BACKGROUND OF THE INVENTION

Field of the Invention

The present invention relates to automatic analyzers and automatic analysis methods.

DESCRIPTION OF RELATED ART

An automatic analyzer for analyzing biological components contained in a specimen such as blood or urine includes dispensing probes for respectively dispensing a specimen, a diluted specimen, and a reagent into a reaction container and a washing function for washing these dispensing probes.

Regarding the automatic analyzer with such a configuration, JP 08-194004 A discloses that "when the sample pipette 22 accesses the dilution container 11, the sampling pump 27 operates and sucks, for example, a diluted sample of 5 µl. When the sample pipette 22 accesses the reaction tube 51, the sampling pump 27 operates and discharges the diluted sample of 5 µl. As a result, the sample of 1 µl is injected into the reaction tube. The sample pipette 22 is washed in the washing pot 28. In the same manner as the case of a dilution pipette, the inside of the sample pipette 22 is washed by a high-pressure washing pump HWP and the outside of the sample pipette 22 is washed by a low-pressure washing pump LWP, and the washing liquids are discharged to a waste liquid tank".

SUMMARY OF THE INVENTION

In the above-described automatic analyzer, by the way, the sample pipette is washed, whenever the diluted sample (specimen) is dispensed from the dilution container into the reaction tube. For this reason, as the number of dispensing times from one dilution container to the reaction tube increases, an amount of the washing liquid that is introduced into the dilution container from the washed sample pipette is increased, and the concentration of the diluted sample (specimen) in the dilution container is reduced.

However, the dispensing amount of a diluted sample (specimen) has a different value set for every measurement item, and the measurement items are also different for every specimen. Hence, after one time of dispensation is performed, the amount of the diluted sample (specimen) left in the dilution container is not constant, and the dilution ratio of the diluted sample (specimen) diluted with the washing liquid that has been introduced also takes a different value. Accordingly, in a case where the number of dispensing times from one dilution container is limited to a fixed number of times, even though the concentration of the specimen in the dilution container is sufficient, the diluted sample (specimen) is discarded in some cases.

Therefore, the present invention has an object to provide an automatic analyzer and an automatic analysis method, by which while analysis accuracy can be improved by using a specimen having a stable concentration, utilization efficiency of the specimen can be improved by minimizing a waste amount of the specimen.

To achieve such an object, according to the present invention, there are provided an automatic analyzer and an automatic analysis method performed in the automatic analyzer including: a specimen holding unit configured to hold a specimen container in which a specimen is stored; a dispensed container holding unit configured to hold a plurality of dispensed containers; a dispensing probe configured to separate a predetermined amount of the specimen from the specimen container, and configured to dispense the specimen that has been separated into the dispensed container; a probe washing device configured to wash a leading end of the dispensing probe in a washing liquid, after the specimen is dispensed into the dispensed container and before a next predetermined amount of the specimen is separated from the specimen container; and a controller configured to control driving of the dispensing probe, in which the controller includes an arithmetic processing unit configured to calculate, for every specimen, a concentration of the specimen in the specimen container, the specimen being subject to dilution with the washing liquid adhered to the leading end of the dispensing probe in the probe washing device, and configured to set a maximum number of times for dispensing the specimen from the specimen container into the dispensed container, based on the concentration that has been calculated.

According to the present invention, there are provided an automatic analyzer and an automatic analysis method, by which while analysis accuracy can be improved by using a specimen having a stable concentration, utilization efficiency of the specimen can be improved by minimizing a waste amount of the specimen.

BRIEF DESCRIPTION OF THE DRAWINGS

FIG. 2 is a block diagram showing the automatic analyzer according to an embodiment;

FIG. 3 is a diagram for indicating a configuration of a probe washing device provided in the automatic analyzer and washing of a diluted specimen probe, according to an embodiment;

FIG. 5 is a table showing an example of the maximum number of times derivation information for dispensation stored in storage unit 53 of an automatic analyzer as setting information according to an embodiment.

DESCRIPTION OF THE INVENTION

<<Automatic Analyzer>>

Figure 1:
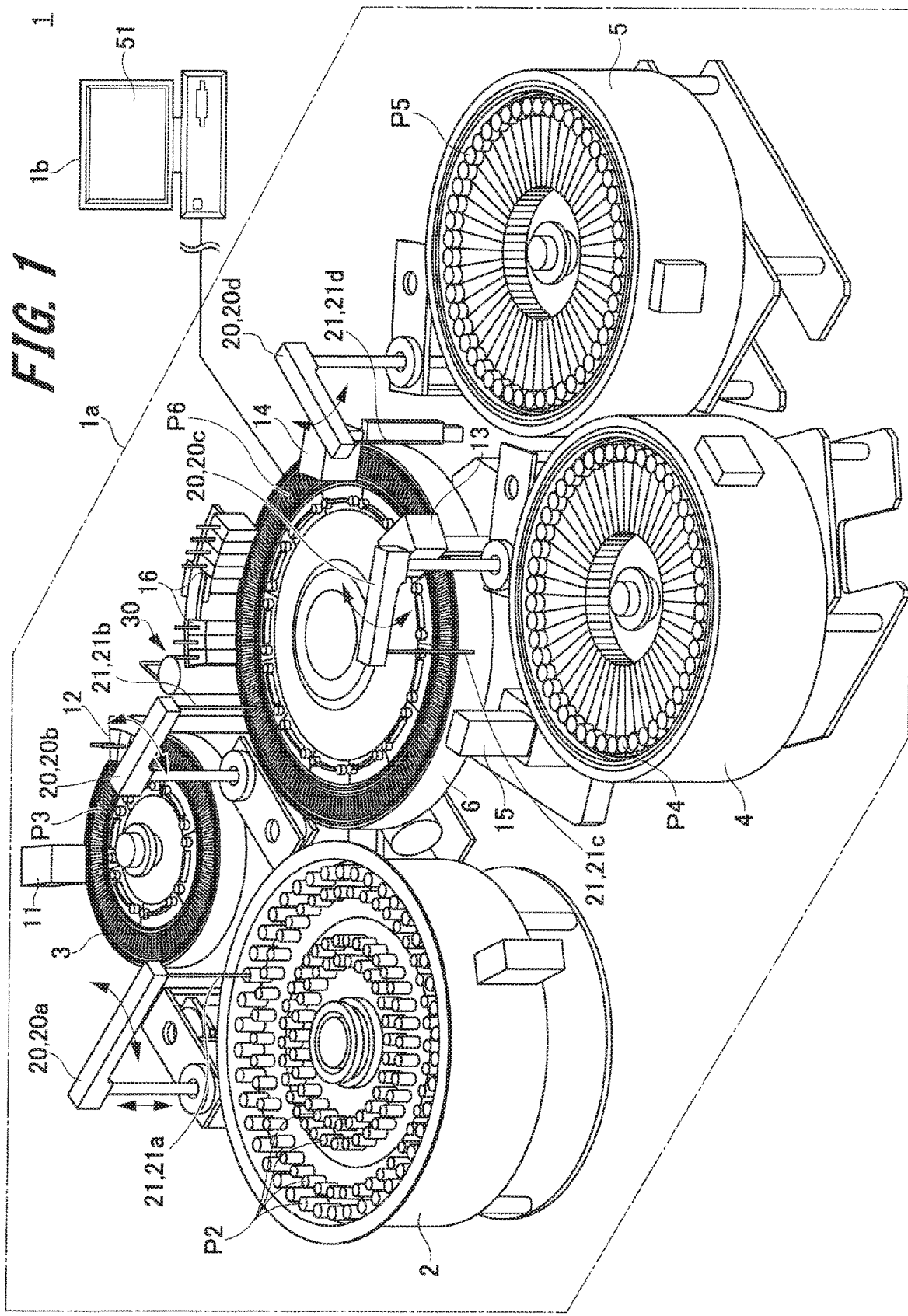
FIG. 1 is a schematic configuration diagram showing an automatic analyzer according to an embodiment.

FIG. 1 is a schematic configuration diagram showing an automatic analyzer according to an embodiment. FIG. 1 is a schematic configuration diagram showing an automatic analyzer 1, in which the present invention is applied to a biochemical analyzer for analyzing biological components contained in a specimen such as blood or urine, as an example. As shown in the figure, the automatic analyzer 1 includes a measurement unit 1a and a controller 1b.

The measurement unit 1a includes, for example, a specimen holding unit 2, a diluted specimen holding unit 3, a first reagent holding unit 4, a second reagent holding unit 5, and a reaction container holding unit 6. The measurement unit 1a also includes a dilution mixing device 11, a dilution container washing device 12, a first reaction mixing device 13, a second reaction mixing device 14, an instrumentation unit 15, and a reaction container washing device 16.

The measurement unit 1a also includes a plurality of dispensing devices 20 and a probe washing device 30. The plurality of dispensing devices 20 are, for example, four dispensing devices including a specimen dispensing device 20a, a diluted specimen dispensing device 20b, a first reagent dispensing device 20c, and a second reagent dispensing device 20d. The dispensing devices 20 each have a dispensing probe 21.

FIG. 2 is a block diagram showing the automatic analyzer 1 according to an embodiment. As shown in this diagram, the controller 1b includes a display unit 51, an input unit 52, a storage unit 53, an arithmetic processing unit 54, and an input and output controller 55.

Hereinafter, the details of these component units will be described in the order of the measurement unit 1a and the controller 1b, based on FIGS. 1 and 2.

<<Measurement Unit 1a>>

[Specimen Holding Unit 2]

The specimen holding unit 2 holds a plurality of specimen containers P2, in each of which a specimen is stored. Such a specimen holding unit 2 has, for example, a turntable shape, and holds the plurality of specimen containers P2 in a plurality of rows along the periphery of the specimen holding unit 2, and conveys the specimen containers P2, which the specimen holding unit 2 holds, in both directions of the circumference. The specimen holding unit 2 is supported rotatably in the circumferential direction by a driving mechanism, not shown. In each specimen container P2, which is held by the specimen holding unit 2, a control specimen for accuracy management may be stored in addition to the specimen to be subject to measurement. The specimen holding unit 2 has a configuration in which such various specimens are respectively held at predetermined positions.

It is to be noted that in the specimen holding unit 2, in addition to the specimen container P2, a dilution liquid container in which a dilution liquid is stored or a washing container in which a washing liquid is stored may be held. Further, the above-described specimen holding unit 2 may have a function of cooling the specimen containers P2 and other containers, which the specimen holding unit 2 holds.

[Diluted Specimen Holding Unit 3]

The diluted specimen holding unit 3 holds a diluted specimen container P3, in which a specimen that has been diluted (hereinafter, referred to as a "diluted specimen") is stored. Such a diluted specimen holding unit 3 has, for example, a turntable shape, and holds a plurality of diluted specimen containers P3 along the periphery of the diluted specimen holding unit 3, and conveys the diluted specimen containers P3, which the diluted specimen holding unit 3 holds, in both directions of the circumference. The diluted specimen holding unit 3 is supported rotatably in the circumferential direction by a driving mechanism, not shown.

The diluted specimen stored in the diluted specimen container P3 is obtained by dispensing the specimen that has been separated from the specimen container P2 disposed in the specimen holding unit 2 and that is diluted at a predetermined concentration. Hence, the diluted specimen container P3 serves as a specimen container for storing a specimen as well as a dispensed container into which a specimen is dispensed. In addition, the diluted specimen holding unit 3 for holding such diluted specimen containers P3 also serves as a specimen holding unit as well as a dispensed container holding unit.

It is to be noted that the diluted specimen holding unit 3 may hold a container in which a specimen that is not diluted is stored, together with the above-described diluted specimen container P3 in which the diluted specimen is stored. In this case, in the container, the specimen that has been separated from the specimen container P2 disposed in the specimen holding unit 2 is dispensed as it is without dilution. Further, the automatic analyzer 1 need not necessarily include the diluted specimen holding unit 3, but herein the description will be given of the configuration including the diluted specimen holding unit 3.

[First Reagent Holding Unit 4 and Second Reagent Holding Unit 5]

The first reagent holding unit 4 has, for example, a turntable shape, and holds a plurality of first reagent containers P4 along the periphery of the first reagent holding unit 4. In addition, the second reagent holding unit 5 has, for example, a turntable shape, and holds a plurality of second reagent containers P5 along the periphery of the second reagent holding unit 5. The first reagent holding unit 4 and the second reagent holding unit 5 respectively convey the first reagent containers P4 and the second reagent containers P5 in both directions of the circumferences. The first reagent holding unit 4 and the second reagent holding unit 5 are each supported rotatably in the circumferential direction by a driving mechanism, not shown. It is to be noted that the number of the reagent holding units provided in the automatic analyzer 1 is not limited to two of the first reagent holding unit 4 and the second reagent holding unit 5, and may be one or a plurality of more than two. In a case where one reagent holding unit is provided in the automatic analyzer 1, any one of the first reagent dispensing device 20c and the second reagent dispensing device 20d to be described later may be provided to correspond to such one reagent holding unit.

[Reaction Container Holding Unit 6]

The reaction container holding unit 6 is one of the dispensed container holding units for holding dispensed containers into which a specimen is dispensed. Such a reaction container holding unit 6 is disposed among the diluted specimen holding unit 3, the first reagent holding unit 4, and the second reagent holding unit 5. The reaction container holding unit 6 has, for example, a turntable shape, and holds a plurality of reaction containers P6 (that is dispensed containers) along the periphery of reaction container holding unit 6, and conveys the reaction containers P6, which the reaction container holding unit 6 holds, in both directions of the circumference. The reaction container holding unit 6 is supported rotatably in the circumferential direction by a driving mechanism, not shown.

In the reaction container P6, which is held by the reaction container holding unit 6, a diluted specimen separated from the diluted specimen container P3 of the diluted specimen holding unit 3, a first reagent separated from the first reagent container P4 of the first reagent holding unit 4, and a second reagent separated from the second reagent container P5 of the second reagent holding unit 5 are respectively dispensed with predetermined amounts. Further, in the reaction container P6, the diluted specimen and at least one of the first reagent and the second reagent are mixed together and a reaction occurs.

The above-described reaction container holding unit 6 is configured to keep the temperature of the reaction container P6 constant using a thermostatic tank, not shown. It is to be noted that in a case where the automatic analyzer 1 does not include the diluted specimen holding unit 3, the specimen that has been separated from the specimen container P2 of the specimen holding unit 2 is dispensed into the reaction container P6, which is held by the reaction container holding unit 6.

[Dilution Mixing Device 11]

The dilution mixing device 11 is disposed at a circumference of the diluted specimen holding unit 3. The dilution mixing device 11 includes a mixing mechanism and a driving mechanism for driving the mixing mechanism. The dilution mixing device 11 mixes a specimen with a dilution liquid in the diluted specimen container P3, which is held by the diluted specimen holding unit 3, and adjusts a diluted specimen in which the specimen and the dilution liquid are mixed together.

[Dilution Container Washing Device 12]

The dilution container washing device 12 is disposed at a circumference of the diluted specimen holding unit 3. The dilution container washing device 12 is a device for washing the diluted specimen container P3 after the diluted specimen is separated by the diluted specimen dispensing device 20b to be described later.

[First Reaction Mixing Device 13 and Second Reaction Mixing Device 14]

The first reaction mixing device 13 and the second reaction mixing device 14 are each disposed at a circumference of the reaction container holding unit 6. The first reaction mixing device 13 mixes the diluted specimen with the first reagent so as to promote the reaction between the diluted specimen and the first reagent, and the second reaction mixing device 14 mixes the diluted specimen with the second reagent so as to promote the reaction between the diluted specimen and the second reagent, in the reaction container P6, which is held by the reaction container holding unit 6. The first reaction mixing device 13 and the second reaction mixing device 14 may have the same configuration as the dilution mixing device 11.

[Instrumentation Unit 15]

The instrumentation unit 15 is disposed to face the outer wall of the reaction container holding unit 6 at a circumference of the reaction container holding unit 6. The instrumentation unit 15 is a multi-wavelength photometer for performing optical measurements on the diluted specimen that has been reacted with the first reagent and the second reagent corresponding to an inspection item in the reaction container P6. The instrumentation unit 15 outputs various component amounts in the specimen as absorbances, and detects a reaction state of the diluted specimen.

[Reaction Container Washing Device 16]

The reaction container washing device 16 is disposed at a circumference of the reaction container holding unit 6. The reaction container washing device 16 is a device for washing the inside of the reaction container P6 after the inspection is completed.

[Specimen Dispensing Device 20a]

The specimen dispensing device 20a is one of the dispensing devices 20, includes a specimen probe 21a as a capillary-shaped dispensing probe 21, and is disposed at a circumference of the specimen holding unit 2 and a circumference of the diluted specimen holding unit 3. The specimen dispensing device 20a inserts a leading end of the specimen probe 21a keeping an axial direction vertical into a specimen in the specimen container P2, which is held by the specimen holding unit 2, and sucks a predetermined amount of the specimen into the specimen probe 21a to separate the predetermined amount of the specimen from the specimen container P2, by means of a driving mechanism, not shown, in accordance with a preset measurement program. In this situation, the specimen holding unit 2 moves the specimen container P2, which is held at a predetermined position of the specimen holding unit 2, to a predetermined specimen dispensation position in accordance with a preset measurement program.

In addition, the specimen dispensing device 20a inserts the leading end of the specimen probe 21a into the diluted specimen container P3 of the diluted specimen holding unit 3, and discharges the specimen that has been sucked into the specimen probe 21a and a predetermined amount of dilution liquid (for example, physiological saline) supplied from the specimen dispensing device 20a itself into the diluted specimen container P3. In this situation, the diluted specimen holding unit 3 moves the diluted specimen container P3, which is held at a predetermined position of the diluted specimen holding unit 3, to a predetermined specimen discharge position in accordance with a preset measurement program. Accordingly, in the diluted specimen container P3, the specimen is diluted to a concentration of a predetermined multiple. Further, a probe washing device, not shown, washes the inner wall of the specimen probe 21a of the specimen dispensing device 20a. In such a case, the probe washing device, not shown, also washes the outer wall of the specimen probe 21a.

It is to be noted that in a case where the automatic analyzer 1 does not include the diluted specimen holding unit 3, the specimen dispensing device 20a inserts the leading end of the specimen probe 21a into the reaction container P6 of the reaction container holding unit 6. Then, the specimen that has been sucked into the specimen probe 21a is discharged into the reaction container P6.

[Diluted Specimen Dispensing Device 20b]

The diluted specimen dispensing device 20b is one of the dispensing devices 20, includes a diluted specimen probe 21b as a capillary-shaped dispensing probe 21, and is disposed between the diluted specimen holding unit 3 and the reaction container holding unit 6. The diluted specimen dispensing device 20b inserts a leading end of the diluted specimen probe 21b into the diluted specimen container P3, which has been moved to a predetermined diluted specimen dispensation position of the diluted specimen holding unit 3, and sucks a predetermined amount of the diluted specimen from the leading end of the diluted specimen probe 21b, which is filled with system water, by means of a driving mechanism, not shown, in accordance with a preset measurement program. Further, the diluted specimen dispensing device 20b inserts the leading end of the diluted specimen probe 21b into the reaction container P6, which has been moved to a predetermined diluted specimen discharge position of the reaction container holding unit 6, and discharges the diluted specimen that has been sucked into the diluted specimen probe 21b into the reaction container P6. It is to be noted that in the case where the automatic analyzer 1 does not include the diluted specimen holding unit 3, the automatic analyzer 1 need not necessarily include the diluted specimen dispensing device 20b.

[First Reagent Dispensing Device 20c and Second Reagent Dispensing Device 20d]

Referring to FIG. 1, the first reagent dispensing device 20c and the second reagent dispensing device 20d are each one of the dispensing devices 20 and each have the same configuration as the other dispensing devices. The first reagent dispensing device 20c is disposed between the reaction container holding unit 6 and the first reagent holding unit 4, and the second reagent dispensing device 20d is disposed between the reaction container holding unit 6 and the second reagent holding unit 5. The first reagent dispensing device 20c dispenses the first reagent from the first reagent container P4 of the first reagent holding unit 4 into the reaction container P6 in accordance with a preset measurement program. Further, the second reagent dispensing device 20d dispenses the second reagent from the second reagent container P5 of the second reagent holding unit 5 into the reaction container P6 in accordance with a preset measurement program.

[Probe Washing Device 30]

The probe washing device 30 is provided for washing the leading end of the dispensing probe 21 in each dispensing device 20, and is disposed on a track along which each dispensing probe 21 moves. FIG. 1 shows, as an example, a state where the probe washing device 30 is disposed on a track of the diluted specimen probe 21b between the diluted specimen holding unit 3 and the reaction container holding unit 6.

FIG. 3 is a diagram for indicating a configuration of the probe washing device 30 provided in the automatic analyzer according to an embodiment and washing of the diluted specimen probe 21b. As shown in this diagram, the probe washing device 30 includes a washing tank 31 and a washing liquid supply pipe 32 for supplying a washing liquid L to the washing tank 31. The washing tank 31 is equipped with a drainpipe, not shown here. In addition, the washing liquid supply pipe 32 discharges the washing liquid L at a predetermined timing by means of a driving mechanism, not shown.

The washing liquid L is typically water, and washing water is used.

The diluted specimen probe 21b is washed by such a probe washing device 30 repeatedly in the following order in every cycle of one time for dispensing the diluted specimen Sp via the diluted specimen probe 21b.

That is, in one dispensing cycle, the diluted specimen dispensing device 20b inserts the diluted specimen probe 21b into the diluted specimen container P3 of the diluted specimen holding unit 3 in accordance with a preset measurement program. Then, a predetermined amount of the diluted specimen Sp is sucked into the diluted specimen probe 21b to separate a predetermined amount of the specimen from the diluted specimen container P3. Next, the diluted specimen dispensing device 20b inserts the diluted specimen probe 21b into one reaction container P6 of the reaction container holding unit 6, and discharges the diluted specimen Sp, which has been sucked into the diluted specimen probe 21b, to dispense a predetermined amount of the diluted specimen Sp into the reaction container P6. Subsequently, the diluted specimen dispensing device 20b moves the leading end of the diluted specimen probe 21b into the washing tank 31. Then, the probe washing device 30 supplies the washing liquid L from the washing liquid supply pipe 32, and washes the outer wall of the diluted specimen probe 21b, which has been inserted into the washing tank 31, by means of a driving mechanism, not shown, in accordance with a preset measurement program. In this situation, the probe washing device 30 also washes the inner wall of the diluted specimen probe 21b of the diluted specimen dispensing device 20b.

One dispensing cycle is operated as described above. The diluted specimen dispensing device 20b inserts the diluted specimen probe 21b, the outer wall of which has been washed in the washing tank 31, into the diluted specimen container P3 of the diluted specimen holding unit 3 again. After that, the same operation is repeatedly carried out.

It is to be noted that the probe washing device 30 having the configuration as described above may use a specimen container P2, which is held by the specimen holding unit 2, or a diluted specimen container P3, which is held by the diluted specimen holding unit 3, as a washing tank 31. As an example, in the case where the probe washing device 30 is provided on the track of the diluted specimen probe 21b as described above, one of the diluted specimen containers P3 may serve as the washing tank 31 of the probe washing device 30.

<Controller 1b>

Referring to FIGS. 1 and 2, the controller 1b is connected with the driving mechanisms of the respective component units constituting the measurement unit 1a, and the instrumentation unit 15. Such a controller 1b includes the display unit 51, the input unit 52, the storage unit 53, the arithmetic processing unit 54, and the input and output controller 55, which are connected with one another. Among them, the arithmetic processing unit 54 and the input and output controller 55 are each configured with a computer such as a microcomputer. The computer includes a storage unit such as a Central Processing Unit (CPU), a Read Only Memory (ROM), and a Random Access Memory (RAM), and controls operations of the respective units in the automatic analyzer 1. Hereinafter, details of the respective component units of the controller 1b will be described.

[Display Unit 51]

The display unit 51 displays measurement results of the instrumentation unit 15, and displays various setting information and various history information in the automatic analyzer 1.

[Input Unit 52]

The input unit 52 receives inputs related to various settings and other inputs performed by an operator of the automatic analyzer 1, and outputs signals that have been input to the input and output controller 55. For the input unit 52, for example, a mouse, a keyboard, a touch panel provided on a display surface of the display unit 51, or the like is used. Also included is another case where the input unit 52 is, for example, a bar code reader for reading a bar code of the specimen container P2, which is held by the specimen holding unit 2.

[Storage Unit 53]

The storage unit 53 is composed of, for example, a recording device having a large capacity, such as a Hard Disk Drive (HDD) or a semiconductor memory. Further, a part of the storage unit 53 may constitute the above computer. Various programs to be executed by the input and output controller 55 to be described next and various setting information for executing the programs are stored in the storage unit 53.

The setting information in the information stored in the storage unit 53 includes dispensing information related to each measurement item and dispensing information common to the measurement items. These pieces of information are stored in the storage unit 53 beforehand, or include information stored in the storage unit 53, based on an input from the input unit 52.

The dispensing information related to the measurement item includes information about a dilution condition of a diluted specimen used in an analysis process of each measurement item, a dispensing order between the measurement items, and a diluted specimen usage amount $[S_i]$ in the analysis process of each measurement item. These pieces of information are assumed to be stored in the storage unit 53 in association with each measurement item.

Further, the common dispensing information includes a washing liquid introduced amount [a], a dispensing loss amount [b], an initial amount [$V_0$], and a dilution ratio maximum value [Rmax], when a diluted specimen is dispensed from the diluted specimen container P3 into the reaction container P6. Among these, the washing liquid introduced amount [a] is an amount of the washing liquid L that is introduced from the probe washing device 30 into the diluted specimen container P3 via the diluted specimen probe 21b after one dispensing cycle. In addition, the dispensing loss amount [b] is an amount of a diluted specimen that needs to be separated additionally from the diluted specimen container P3 to the diluted specimen probe 21b in order to ensure dispensing accuracy via the diluted specimen probe 21b. Furthermore, the initial amount [$V_0$] is an initial amount of the diluted specimen stored in one diluted specimen container P3. Such an initial amount [$V_0$] may be information input from the input unit 52 when the analysis is started. Further, the dilution ratio maximum value [Rmax] is an upper limit value of the dilution ratio with respect to the initial concentration of the diluted specimen Sp in the diluted specimen container P3, and is an upper limit value of the dilution ratio of the diluted specimen Sp to be diluted with the washing liquid L.

[Arithmetic Processing Unit 54]

The arithmetic processing unit 54 sets a maximum number of times [imax] for dispensation from one diluted specimen container P3 to a plurality of reaction containers P6 for every specimen, based on the information input from the input unit 52 and the information stored in the storage unit 53. A procedure by the arithmetic processing unit 54 for setting the maximum number of times [imax] for dispensation will be described in detail in an automatic analysis method below.

[Input and Output Controller 55]

The input and output controller 55 controls operations of the driving mechanisms of the respective component units constituting the measurement unit 1a, based on signals from the input unit 52, the storage unit 53, and the arithmetic processing unit 54, and performs an analysis process of the specimen contained in the specimen container P2 of the specimen holding unit 2.

<<Automatic Analysis Method>>

Figure 4:
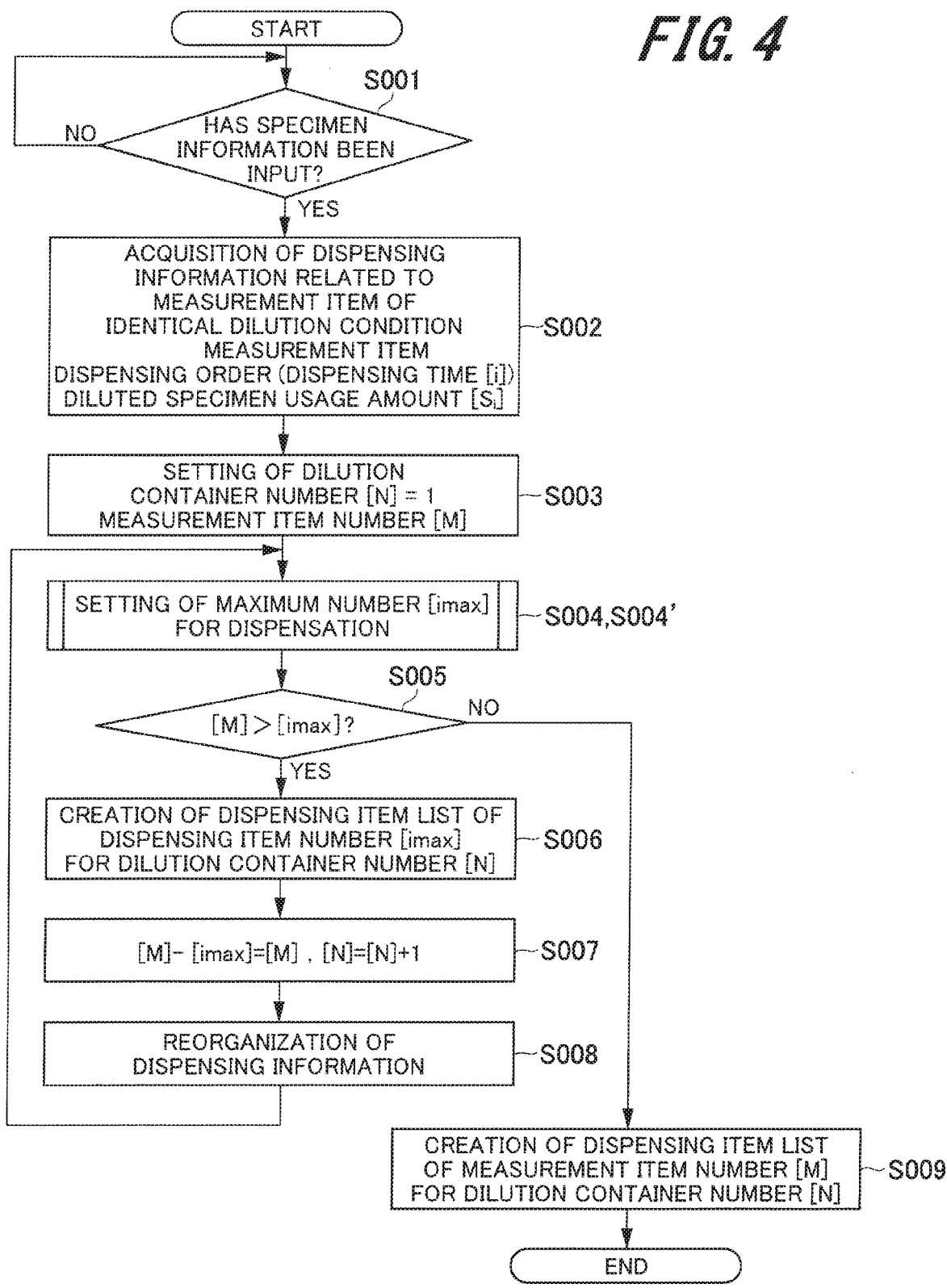
FIG. 4 is a flowchart showing an automatic analysis method using the automatic analyzer according to an embodiment.

FIG. 4 is a flowchart showing an automatic analysis method using the automatic analyzer 1 according to an embodiment. Hereinafter, the automatic analysis method using the automatic analyzer 1 according to an embodiment will be described in the order shown in the flowchart of FIG. 4 with reference to FIGS. 1 and 2 as shown above. The automatic analysis method to be described with reference to these figures is a procedure applied as a process to be performed before a specimen in a diluted specimen container P3 is dispensed into a reaction container P6.

This procedure is carried out as follows by the CPU, which constitutes the arithmetic processing unit 54 and the input and output controller 55, which have been described with reference to FIG. 2, performing a program stored in the storage unit 53.

<Step S001>

In step S001, the input and output controller 55 determines whether specimen information has been input from the input unit 52, and waits until determining that the specimen information has been input (YES). Here, the specimen information is information related to the specimen in the specimen container P2, which is held by the specimen holding unit 2, and includes ID information of the specimen and measurement items set for the specimen. In addition, the specimen information may also include an initial amount [$V_0$] of the diluted specimen stored in one diluted specimen container P3. Such specimen information may be, for example, bar code information attached to the specimen container P2, and may be information that has been read by a bar code reader as the input unit 52. When it is determined that such specimen information has been input (YES), the arithmetic processing unit 54 proceeds to the next step S002.

<Step S002>

In step S002, the input and output controller 55 acquires the dispensing information related to measurement items of an identical dilution condition for a specimen in one specimen container P2, which is held at a specific position of the specimen holding unit 2, based on the specimen information input in step S001.

That is, in the automatic analyzer 1, the specimen information about the specimen in one specimen container P2 has been input from the input unit 52, and then an automatic analysis flow for the specimen starts. In this case, the analysis process of a plurality of measurement items starts, based on the specimen information that has been input from the input unit 52 for the specimen in one specimen container P2.

Then, the input and output controller 55 first makes a group of the measurement items set for the specimen in one target specimen container P2 for each identical dilution condition, based on the specimen information that has been input from the input unit 52 and the dispensing information stored in the storage unit 53. Next, the input and output controller 55 acquires the dispensing information related to each measurement item from the storage unit 53 for each group having the identical dilution condition. The dispensing information related to the measurement item acquired here includes an [i]-th time dispensation, which represents a dispensing order among the measurement items, and a diluted specimen usage amount [$S_i$] for each measurement item in the analysis process, as shown in Table 1 below. It is to be noted that the [i]-th time dispensation is applied to each measurement item set for the specimen in one target specimen container P2, based on the dispensing order among the measurement items stored in the storage unit 53.

TABLE 1

| | Dispensing information | |
|---|---|---|
| Measurement item | Dispensing time [i] | Diluted specimen usage amount [$S_i$] (μl) |
| 1 TP | 1 | 7.5 |
| 2 ALB | 2 | 8 |
| 3 LD | 3 | 10 |
| 4 AST | 4 | 6.3 |
| 5 ALT | 5 | 15 |
| 6 ALP | 6 | 4.2 |
| 7 LAP | 7 | 7.5 |
| 8 ChE | 8 | 9 |
| 9 AMY | 9 | 4.7 |
| 10 BUN | 10 | 2.4 |
| 11 TC | 11 | 4.5 |
| 12 NH3 | 12 | 3.6 |
| 13 Da | 13 | 6.1 |
| 14 Fe | 14 | 5 |
| 15 UA | 15 | 3.2 |

It is to be noted that in Table 1, item numbers are respectively applied to the measurement items of the group having the identical dilution condition. Here, only the dispensing information for one group having the identical dilution condition is shown, but the dispensing information is acquired in the same manner for another group having an identical dilution condition. Additionally, in the next step S003 and later, the same processes are performed in parallel for the respective groups, or the process is sequentially performed for each group.

<Step S003>

In step S003, the input and output controller 55 performs a process for setting a dilution container number [N] to [N]=1. In addition, the number of measurement items [M] is set to the total number of measurement items acquired in step S002. Here, the number of measurement items [M]=15 is set, based on Table 1 above.

<Step S004>

In step S004, the arithmetic processing unit 54 sets the maximum number of times [imax] for dispensation from one diluted specimen container P3. In this situation, the arithmetic processing unit 54 sets the maximum number of times [imax] for dispensation from one diluted specimen container P3 as follows, based on the dispensing information related to the measurement item acquired in step S002 and the common dispensing information stored in the storage unit 53. It is to be noted that the dispensing information related to the measurement item includes [i]-th time dispensation, which represents the dispensing order among the measurement items, and the diluted specimen usage amount [$S_i$] for each measurement item in the analysis process, as described above. In addition, the common dispensing information includes the washing liquid introduced amount [a], the dispensing loss amount [b], the initial amount [$V_0$], and the dilution ratio maximum value [Rmax], when the diluted specimen is dispensed from the diluted specimen container P3 into the reaction container P6, as described above.

First, the arithmetic processing unit 54 calculates a diluted specimen residual liquid amount [$V_i$] left in the diluted specimen container P3 and a diluted specimen concentration [$C_i$], as shown by Equations (1) to (6) below, for every [i]-th time dispensation, that is, after the dispensing cycle of an [i]-th time dispensation ends. The diluted specimen concentration [$C_i$] is a concentration of the specimen in the diluted specimen container P3, which has been diluted by introducing the washing liquid L adhered to the leading end of the diluted specimen probe 21b in the probe washing device 30 into the diluted specimen container P3.

[Expression 1]

When dispensing time [i] = 1

Diluted specimen residual liquid amount   Equation (1)

$$[V_1] = [V_0] + [a] - [b] - [S_1]$$

Diluted specimen concentration $[C_1] = \dfrac{[V_0]}{[V_0]+[a]} \times 100$   Equation (2)

Washing liquid introduced amount [a]

Dispensing loss amount [b]

Initial amount [$V_0$]

Dispensing time [i]

Diluted specimen usage amount ([i]–th time) [$S_i$]

[Expression 2]

When dispensing time [i] = 2

Diluted specimen residual liquid amount   Equation (3)

$$[V_2] = [V_1] + [a] - [b] - [S_2]$$

Diluted specimen concentration $[C_2] = \dfrac{[V_1] \times [C_1]}{[V_1]+[a]} \times 100$   Equation (4)

[Expression 3]

When dispensing time [i]

Diluted specimen residual liquid amount   Equation (5)

$$[V_i] = [V_{i-1}] + [a] - [b] - [S_i]$$

Diluted specimen concentration $[C_i] = \dfrac{[V_{i-1}] \times [C_{i-1}]}{[V_{i-1}]+[a]} \times 100$   Equation (6)

Then, the maximum number of times [imax] is set, based on the diluted specimen concentration [$C_i$], which has been calculated as described above. In this case, for example, the initial diluted specimen concentration [$C_0$] before the dispensation is performed is set to 100%. A value obtained by subtracting the diluted specimen concentration [$C_i$] from the initial diluted specimen concentration [$C_0$] ([$C_0$]–[$C_i$]) is calculated as a dilution ratio [$R_i$] of the diluted specimen Sp after the dispensing cycle of an [i]-th time dispensation ends. The dilution ratio [$R_i$] calculated here becomes a dilution ratio [$R_i$] of the diluted specimen Sp in the diluted specimen container P3 immediately before the dispensing cycle of the next dispensing time [i+1] starts.

Table 2 below shows the dilution ratio [$R_i$] of the diluted specimen Sp, which has been calculated as described above for the dilution container number [N]=1, together with the diluted specimen residual liquid amount [$V_i$] and the diluted specimen concentration [$C_i$].

TABLE 2

Table for calculation of diluted specimen concentration/dilution ratio ([N] = 1)

| | | | After [i]-th time | | |
|---|---|---|---|---|---|
| Item | Dispensing time [i] | Diluted specimen usage amount [$S_i$] (μl) | Diluted specimen residual liquid amount [$V_i$] (μl) | Diluted specimen concentration [$C_i$] | Dilution ratio [$R_i$] |
| — | 0 | — | 150 ([$V_0$]) | 100.00% | 0.00% |
| 1 TP | 1 | 7.5 | 139.6 | 99.93% | 0.07% |
| 2 ALB | 2 | 8 | 128.7 | 98.86% | 0.14% |
| 3 LD | 3 | 10 | 115.8 | 99.78% | 0.22% |
| 4 AST | 4 | 6.3 | 106.6 | 99.70% | 0.30% |
| 5 ALT | 5 | 15 | 88.7 | 99.60% | 0.40% |
| 6 ALP | 6 | 4.2 | 81.6 | 99.49% | 0.51% |
| 7 LAP | 7 | 7.5 | 71.2 | 99.37% | 0.63% |
| 8 ChE | 8 | 9 | 59.3 | 99.23% | 0.77% |
| 9 AMY | 9 | 4.7 | 51.7 | 99.06% | 0.94% |
| 10 BUN | 10 | 2.4 | 46.4 | 98.87% | 1.13% |
| 11 TC | 11 | 4.5 | 39 | 98.66% | 1.34% |
| 12 NH3 | 12 | 3.6 | 32.5 | 98.41% | 1.59% |
| 13 Ca | 13 | 6.1 | 23.5 | 98.11% | 1.89% |

TABLE 2-continued

Table for calculation of diluted specimen concentration/dilution ratio ([N] = 1)

| Item | Dispensing time [i] | Diluted specimen usage amount $[S_i]$ (µl) | After [i]-th time | | |
|---|---|---|---|---|---|
| | | | Diluted specimen residual liquid amount $[V_i]$ (µl) | Diluted specimen concentration $[C_i]$ | Dilution ratio $[R_i]$ |
| 14 Fe | 14 | 5 | 15.6 | 97.69% | 2.31% |
| 15 UA | 15 | 3.2 | 9.5 | 97.07% | 2.93% |

Washing liquid introduced amount[a] = 0.1 µl
Dispensing loss amount[b] = 3.0 µl
Initial amount[$V_0$] = 150 µl
Dilution ratio maximum value[Rmax] = 1.5%

Then, the arithmetic processing unit 54 sets an [i]-th time dispensation, in which the calculated dilution ratio $[R_i]$ exceeds the dilution ratio maximum value [Rmax] stored in the storage unit 53, as the maximum number of times [imax] for dispensation. In the example shown in Table 2 above, in the [i]-th time dispensation, in which the calculated dilution ratio $[R_i]$ exceeds the preset dilution ratio maximum value [Rmax], [i]=12 to 15. Hence, the dispensing time [i]=12, which is the smallest number of the dispensing times exceeding the preset dilution ratio maximum value [Rmax], is set as a maximum number of times [imax] for dispensation.

In addition, in a case where the dilution ratio $[R_i]$, which has been calculated at the last [i]-th time dispensation, does not exceed the dilution ratio maximum value [Rmax], the arithmetic processing unit 54 sets a number larger than the measurement item number [M] set in step S003, for example, the number of measurement items [M]+1 to the maximum number of times [imax].

It is to be noted that the maximum number of times [imax] may be set by comparing the diluted specimen concentration $[C_i]$ with a lower limit value of the diluted specimen concentration. In this case, the lower limit value of the diluted specimen concentration is stored in the storage unit 53. Then, from among the dispensing times [i] in which the calculated diluted specimen concentration $[C_i]$ is less than the lower limit value (for example, 98.5%, here) of the diluted specimen concentration stored in the storage unit 53, the minimum number of the dispensing times is set as the maximum number of times [imax] for dispensation.

<Step S005>

In step S005, the input and output controller 55 compares the number of measurement items [M] with the maximum number of times [imax] calculated by the arithmetic processing unit 54, and determines whether the number of measurement items [M] is larger than the maximum number of times [imax]. When determining that the number of measurement items [M] is larger than the maximum number of times [imax] (YES), the input and output controller 55 proceeds to the next step S006. On the other hand, when determining that the number of measurement items [M] is not larger than the maximum number of times [imax] (NO), the input and output controller 55 proceeds to step S009.

In the example shown in Table 2 above, the number of measurement items [M]=15 and the maximum number of times [imax]=12. Hence, it is determined that the number of measurement items [M] is larger than the maximum number of times [imax] (YES), and the flow proceeds to the next step S006.

<Step S006>

In step S006, the input and output controller 55 creates a dispensing item list including the number of items from the dispensing time [i]=1 to the maximum number of times [imax] (for example, [imax]=12) for the dilution container number [N] (for example, [N]=1). Table 3 below shows the dispensing item list for the dilution container number [N]=1, which has been created in such a manner.

TABLE 3

Dispensing item list for [N] = 1

| Item | Dispensing time [i] | Diluted specimen usage amount $[S_i]$ (µl) |
|---|---|---|
| 1 TP | 1 | 7.5 |
| 2 ALB | 2 | 8 |
| 3 LD | 3 | 10 |
| 4 AST | 4 | 6.3 |
| 5 ALT | 5 | 15 |
| 6 ALP | 6 | 4.2 |
| 7 LAP | 7 | 7.5 |
| 8 ChE | 8 | 9 |
| 9 AMY | 9 | 4.7 |
| 10 BUN | 10 | 2.4 |
| 11 TC | 11 | 4.5 |
| 12 NH3 | 12 | 3.6 |

It is to be noted that after the dispensing item list is created, a specimen and a dilution liquid may be discharged from the specimen container P2 into one diluted specimen container P3 (for example, [N]=1), based on the dispensing item list created in step S006, so as to adjust the diluted specimen having an amount corresponding to the initial amount $[V_0]$, and the dispensation of the diluted specimen may be started from the above-described diluted specimen container P3 to each reaction container P6. In this case, it is assumed that the above-described one diluted specimen container P3 contains the diluted specimen Sp, which is diluted on a corresponding dilution condition. Further, such adjustment of the diluted specimen and the operation of dispensing the diluted specimen that has been adjusted may be performed after a series of processes shown in the flowchart ends.

<Step S007>

In step S007, the input and output controller 55 performs a process of setting the number of measurement items [M] to [M]=[M]−[imax]. In addition, the input and output controller 55 performs a process of setting the dilution container number [N] to [N]=[N]+1.

<Step S008>

In step S008, the input and output controller 55 reorganizes the dispensing information. In this situation, the input and output controller 55 excludes the dispensing information in the dispensing item list created in step S006 from the current dispensing information shown in Table 1 above, and obtains new dispensing information by reapplying an [i]-th time dispensation, which represents a dispensing order among the measurement items, as shown in Table 4 below.

TABLE 4

Dispensing information (reorganization)

| Item | Dispensing time [i] | Diluted specimen usage amount $[S_i]$ (μl) |
|---|---|---|
| 13 Ca | 1 | 6.1 |
| 14 Fe | 2 | 5 |
| 15 UA | 3 | 3.2 |

After that, the flow returns to step S004, and the following steps are repeatedly performed.

<Step S009>

Step S009 is proceeded from step S005, because the number of measurement items [M] is not larger than the maximum number of times [imax] (NO), that is, it is determined that the number of measurement items [M] is equal to or less than the maximum number of times [imax]. In this step S009, the input and output controller 55 creates a dispensing item list of all item numbers [M] starting from the dispensing time [i]=1, for the dilution container number [N].

In step S004 performed before step S009, here, the maximum number of times for dispensation is set as described above.

As an example, a case where the dispensing information of Table 4 above is obtained at the time of step S004 will be described. In this case, in step S004, the arithmetic processing unit 54 first calculates the diluted specimen residual liquid amount $[V_i]$, the diluted specimen concentration $[C_i]$, and the dilution ratio $[R_i]$ of the diluted specimen Sp from the dispensing information in Table 4 above. Table 5 below shows the dilution ratio $[R_i]$ of the diluted specimen Sp that has been calculated as described above for the dilution container number [N]=2, together with the diluted specimen residual liquid amount $[V_i]$ and the diluted specimen concentration $[C_i]$.

TABLE 5

Table for calculation of diluted specimen concentration/dilution ratio ([N] = 2)

| | | | After [i]-th time | | |
|---|---|---|---|---|---|
| Item | Dispensing time [i] | Diluted specimen usage amount $[S_i]$ (μl) | Diluted specimen residual liquid amount $[V_i]$ (μl) | Diluted specimen concentration $[C_i]$ | Dilution ratio $[R_i]$ |
| — | — | — | 150 ($[V_0]$) | 100.00% | 0.00% |
| 13 Ca | 1 | 6.1 | 141 | 99.93% | 0.07% |
| 14 Fe | 2 | 5 | 133.1 | 99.85% | 0.15% |
| 15 UA | 3 | 3.2 | 127 | 99.77% | 0.23% |

Washing liquid introduced amount [a] = 0.1 μl
Dispensing loss amount [b] = 3.0 μl
Initial amount $[V_0]$ = 150 μl
Dilution ratio maximum value [Rmax] = 1.5%

Next, the arithmetic processing unit 54 calculates the [i]-th time dispensation, in which the calculated dilution ratio $[R_i]$ exceeds the dilution ratio maximum value [Rmax] stored in the storage unit 53, as the maximum number of times [imax] for dispensation. In this situation, the dilution ratio $[R_i]$, which has been calculated at the last [i]-th time dispensation, does not exceed the dilution ratio maximum value [Rmax]. Therefore, in step S004, a larger number than the number of measurement items [M] (here, [M]=3), for example, the number of measurement items [M]+1 is set to the maximum number of times [imax] (here, [imax]=4).

Accordingly, in step S005 performed before the current step S009, the number of measurement items [M] (=3) is not larger than the maximum number of times [imax] (=4) (NO). That is, it is determined that the number of measurement items [M] is equal to or less than the maximum number of times [imax].

Then, in the current step S009, the input and output controller 55 creates a dispensing item list of all item numbers [M] starting from the dispensing time [i]=1, for the dilution container number [N] (for example, [N]=2). Table 6 below shows the dispensing item list for the dilution container number [N]=2, which has been created in such a manner.

TABLE 6

Dispensing item list for [N] = 2

| Item | Dispensing time [i] | Diluted specimen usage amount $[S_i]$ (μl) |
|---|---|---|
| 13 Ca | 1 | 6.1 |
| 14 Fe | 2 | 5 |
| 15 UA | 3 | 3.2 |

After step S009, a series of processes is ended. It is to be noted that after the dispensing item list is created, a specimen and a dilution liquid may be discharged from the specimen container P2 into one diluted specimen container P3 (for example, [N]=2), based on the dispensing item list created in step S009, so as to adjust the diluted specimen having an amount corresponding to the initial amount $[V_0]$, and the dispensation of the diluted specimen may be started from the above-described diluted specimen container P3 into each reaction container P6. The above-described one diluted specimen container P3 in this case contains the diluted specimen Sp, which is diluted on a corresponding dilution condition, and is another diluted specimen container P3 (for example, [N]=2), which is different from the diluted specimen container P3 used in the dispensation based on the dispensing item list created in step S006. Further, such adjustment of the diluted specimen and the operation of dispensing the diluted specimen that has been adjusted may be performed after a series of processes shown in the flowchart ends.

Effects of Embodiments

In the automatic analyzer 1 and the automatic analysis method according to embodiments described above, the maximum number of times [imax] for dispensation from the diluted specimen container P3 is set for every specimen, based on the concentration of the diluted specimen Sp in the case where the washing liquid L adhered to the leading end of the diluted specimen probe 21b is introduced into the diluted specimen container P3 in every dispensing cycle. Therefore, even in a case where analyses are performed on a plurality of measurement items respectively having different diluted specimen usage amounts [$S_i$], analysis accuracy can be improved by performing an analysis using a diluted specimen having a stable concentration, and in addition, utilization efficiency of the specimen can be improved by minimizing a waste amount of the specimen.

<<Variations>>

Next, variations of the automatic analyzer and the automatic analysis method will be described.

An automatic analyzer according to a variation is different from the automatic analyzer 1, which has been described above with reference to FIGS. 1 to 3, in setting information stored in the storage unit 53 of the controller 1b. In addition, an automatic analyzer according to the variation is different from the automatic analyzer 1, which has been described above with reference to FIGS. 1 to 3, in a procedure of step S004' in the flowchart of FIG. 4, from among programs of an automatic analysis method performed by the arithmetic processing unit 54 and the input and output controller 55. Since other component units are the same as those of the automatic analyzer 1 and the automatic analysis method that have been described above, hereinafter only the differences will be described.

<Controller 1b>

[Storage Unit 53]

In the storage unit 53 of the automatic analyzer 1, dispensing information related to each measurement item and a maximum number of times [imax] derivation information for dispensation are stored as setting information. These pieces of information are stored in the storage unit 53 beforehand, or include information stored in the storage unit 53, based on an input from the input unit 52.

The dispensing information related to the measurement item is the same as the information described above, and includes information about a dilution condition of a diluted specimen used in an analysis process of each measurement item, an [i]-th time dispensation, which represents a dispensing order among the measurement items, and a diluted specimen usage amount [$S_i$] in the analysis process of each measurement item. These pieces of information are assumed to be stored in the storage unit 53 in association with each measurement item.

Further, the maximum number of times [imax] derivation information for dispensation is information for deriving the maximum number of times [imax] for dispensation from one diluted specimen container P3 to the reaction container P6. FIG. 5 shows an example of the maximum number of times [imax] derivation information.

As shown in FIG. 5, the maximum number of times [imax] derivation information is information for deriving the maximum number of times [imax], based on, for example, an initial amount [$V_0$] of the diluted specimen Sp contained in the diluted specimen container P3 and an average value [Sav] of the diluted specimen usage amounts, and is created as follows.

First, an approximate value [$Ca_i$] of the diluted specimen concentration is calculated, based on Equation (7) below, after the dispensing cycle of an [i]-th time dispensation ends.

[Expression 4]

When dispensing time [i] = 1    Equation (7)

Approximate value of diluted specimen concentration $$[Ca_i] = \frac{[C_{i-1}] \times ([V_0] - (i-1) \times ([S_{av}]) + [b]))}{[V_0] - (i-1) \times ([S_{av}] + [b]) + [a]}$$

Washing liquid introduced amount [a]

Dispensing loss amount [b]

Initial amount [$V_0$]

Dispensing time [i]

Average value of diluted specimen usage amounts $[S_{av}] = \sum[S_i]/[M]$

The number of measurement items [M]

It is to be noted that the washing liquid introduced amount [a] is an amount of the washing liquid L that is introduced from the probe washing device 30 to the diluted specimen container P3 via the diluted specimen probe 21b after one dispensing cycle. The washing liquid introduced amount [a] takes a fixed value. The dispensing loss amount [b] is an amount of a diluted specimen, which needs to be separated additionally from the diluted specimen container P3 to the diluted specimen probe 21b in order to ensure dispensing accuracy via the diluted specimen probe 21b. The dispensing loss amount [b] takes a fixed value. The initial amount [$V_0$] is an initial amount of the diluted specimen stored in one diluted specimen container P3, and takes a variable. The [i]-th time dispensation is a dispensing order among measurement items. The average value [Sav] of the diluted specimen usage amounts is an amount based on the average value of the diluted specimen usage amounts [$S_i$] in the number of measurement items [M], and takes a variable.

Here, on each condition in which the initial amount [$V_0$] and the average value [Sav] of the diluted specimen usage amounts are varied, the approximate value [$Ca_i$] of the diluted specimen concentration is calculated, based on Equation (7) above with the [i]-th time dispensation as a parameter.

Then, the maximum number of times [imax] is set, based on the approximate value [$Ca_i$] of the diluted specimen concentration that has been calculated as described above. In this case, the initial diluted specimen concentration [$C_0$] is set to 100%, and a value obtained by subtracting the approximate value [$Ca_i$] of the diluted specimen concentration from the initial diluted specimen concentration [$C_0$] ([$C_0$]−[$Ca_i$]), is calculated as a dilution ratio [$R_i$] of the diluted specimen Sp after the dispensing cycle of each of the [i]-th time dispensation ends. Then, regarding the case where the initial amount [$V_0$] and the average value [Sav] of the diluted specimen usage amounts satisfy the respective conditions, the [i]-th time dispensation, in which the calculated dilution ratio [$R_i$] exceeds the dilution ratio maximum value [Rmax] stored in the storage unit 53, is calculated as the maximum number of times [imax] for dispensation corresponding to the respective conditions, and FIG. 5 is obtained.

It is to be noted that the maximum number of times [imax] may be set by comparing the approximate value [$Ca_i$] of the diluted specimen concentration with a lower limit value of the diluted specimen concentration. In this case, the lower limit value of the diluted specimen concentration is stored in the storage unit 53. Then, from among the dispensing times [i] in which the calculated approximate value [$Ca_i$] of the diluted specimen concentration is less than the lower limit value (for example, 98.5%, here) of the diluted specimen concentration stored in the storage unit 53, the minimum number of the dispensing times is set as the maximum number of times [imax] for dispensation, and FIG. 5 is obtained.

<Step S004'>

In step S004', the arithmetic processing unit 54 calculates the maximum number of times [imax] for dispensation from one diluted specimen container P3, as follows.

That is, the arithmetic processing unit 54 calculates the maximum number of times [imax], based on the dispensing information related to the measurement item, the initial amount [$V_0$] of the diluted specimen Sp contained in the diluted specimen container P3, and the maximum number of times [imax] derivation information shown in FIG. 5. The dispensing information related to the measurement item is the information acquired in step S002, and an average value [Sav] of the diluted specimen usage amounts is calculated from the dispensing information. The average value [Sav] of the diluted specimen usage amounts calculated here takes a value (for example, [Sav]=9.47 µl), which is obtained by adding a dispensing loss amount [b] (for example, [b]=3 µl) to an average value (=6.47 µl) of the diluted specimen usage amounts [$S_i$] in the dispensing information shown in Table 1.

Then, the calculated average value [Sav] (=9.47 µl) of the diluted specimen usage amounts and the initial amount [$V_0$] (for example, [$V_0$]=150 µl) are collated with the maximum number of times [imax] derivation information shown in FIG. 5 to derive the maximum number of times [imax] (=13).

Regarding the later steps, it is sufficient if the later steps are carried out in the same manner as described with reference to the flowchart of FIG. 4.

Effects of Variations

Also in the configuration according to a variation that has been described above, the maximum number of times [imax] for dispensation from the diluted specimen container P3 is set for every specimen, based on an approximate value of the concentration of the diluted specimen Sp in the case where the washing liquid L adhered to the leading end of the diluted specimen probe 21*b* is introduced into the diluted specimen container P3 in every dispensing cycle. Therefore, in the same manner as the embodiments described above, while the analysis accuracy can be improved, utilization efficiency of the specimen can be improved. Furthermore, since the maximum number of times [imax] derivation information shown in FIG. 5 is prepared beforehand, a calculation process for setting the maximum number of times [imax] is facilitated. Consequently, the setting of the maximum number of times [imax] can be accelerated, and the analysis process can be accelerated, accordingly.

It is to be noted that in the embodiments including the variations described above, the case where the present invention is applied to the dispensation from the diluted specimen container P3 to the reaction container P6 has been described. The present invention, however, is applicable to dispensing from the specimen container P2 to the diluted specimen container P3 or dispensing from the specimen container P2 to the reaction container P6, and the same effects are obtainable, when applied. In addition, the specimen holding unit 2 may be a specimen rack conveying device for conveying a specimen rack that stores a plurality of specimen containers, and the specimen container P2 may be a specimen container conveyed by the specimen rack conveying device.

What is claimed is:

1. An automatic analyzer comprising:
a specimen holding unit configured to hold a plurality of specimen containers in which a plurality of specimens are stored;
a dispensed container holding unit configured to hold a plurality of dispensed containers;
a dispensing probe configured to separate a predetermined amount of a respective specimen from one of the plurality of specimen containers, and configured to dispense the respective specimen that has been separated into a respective dispensed container among the plurality of dispensed containers;
a probe washing device configured to wash a leading end of the dispensing probe in a washing liquid, after the respective specimen is dispensed into the respective dispensed container and before a next predetermined amount of the respective specimen is separated; and
a controller configured to control driving of the dispensing probe, wherein
the controller comprises an arithmetic processing unit configured to:
calculate, for every specimen, based on an initial amount of each individual specimen stored in each corresponding specimen container, specimen usage amounts of a plurality of measurement items set for each individual specimen, and a washing liquid introduced amount into each corresponding specimen container, a concentration of each individual specimen in each corresponding specimen container, each individual specimen being subject to dilution with the washing liquid adhered to the leading end of the dispensing probe in the probe washing device; and
for each individual specimen, set a minimum number of times for dispensation, in which the respective concentration that has been calculated is lower than a preset concentration, as a maximum number of times for dispensation of each individual specimen from each corresponding specimen container into a subset of corresponding dispensed containers among the plurality of dispensed containers.

2. The automatic analyzer according to claim 1, further comprising:
a storage unit configured to store table information of the maximum number of times for dispensation that is set based on an approximate value of each individual specimen concentration in each corresponding specimen container calculated on each condition in which the initial amount of each individual specimen stored in each corresponding specimen container and the specimen usage amounts for a plurality of measurement items set for each individual specimen are varied,
wherein the arithmetic processing unit calculates an average value of the specimen usage amounts of the plurality of measurement items set for each individual specimen, and sets the maximum number of times for dispensation based on: the average value of each individual specimen usage amounts that has been calculated; the initial amount of each individual specimen stored in each corresponding specimen container; and the table information of the maximum number of times of dispensation.

3. The automatic analyzer according to claim 1, wherein the dispensing probe dispenses the respective specimen from the one of the plurality of specimen containers into the respective dispensed container in accordance with a dispensing order between the plurality of measurement items set for the respective specimen.

4. The automatic analyzer according to claim 3, wherein the specimen holding unit configured to hold the plurality of the specimen containers each storing the plurality of specimens, in a case where the number of the plurality of measurement items set for an individual specimen is greater than the maximum number of times that has been set by the arithmetic processing unit, and
the arithmetic processing unit sets the maximum number of times for dispensing the individual specimen successively to a next individual specimen container among the plurality of specimen containers.

5. The automatic analyzer according to claim 1, wherein at least one of the plurality of specimen containers serves as a diluted specimen container in which the respective specimen diluted at a predetermined concentration is stored, and
the respective dispensed container serves as a reaction container into which the respective specimen and a reagent are dispensed.

6. An automatic analysis method, by an automatic analyzer comprising:
a specimen holding unit configured to hold a plurality of specimen containers in which a plurality of specimens are stored;
a dispensed container holding unit configured to hold a plurality of dispensed containers;
a dispensing probe configured to separate a predetermined amount of a respective specimen from one of the plurality of specimen containers, and configured to dispense the respective specimen that has been separated into a respective dispensed container among the plurality of dispensed containers;
a probe washing device configured to wash a leading end of the dispensing probe in a washing liquid, after the respective specimen is dispensed into the respective dispensed container and before a next predetermined amount of the respective specimen is separated; and
a controller configured to control driving of the dispensing probe,
the automatic analysis method comprising:
calculating, for every specimen, a concentration of each individual specimen in each corresponding specimen container, each individual specimen being subject to dilution with the washing liquid adhered to the leading end of the dispensing probe in the probe washing device, the calculating being based on an initial amount of each individual specimen stored in each corresponding specimen container, specimen usage amounts of a plurality of measurement items set for each individual specimen, and a washing liquid introduced amount into each corresponding specimen container, and
setting a maximum number of times for dispensing each individual specimen from each corresponding specimen container into a subset of corresponding dispensed containers among the plurality of dispensed containers, based on a minimum number of times for dispensation, in which the concentration that has been calculated is lower than a preset concentration.

* * * * *